United States Patent [19]

Thompson et al.

[11] 4,228,984
[45] Oct. 21, 1980

[54] VIBRATION ATTENUATOR SEAT

[75] Inventors: James E. Thompson; Robert L. Mayfield, both of Cedar Falls, Iowa

[73] Assignee: Deere & Company, Moline, Ill.

[21] Appl. No.: 960,125

[22] Filed: Nov. 13, 1978

Related U.S. Application Data

[63] Continuation of Ser. No. 861,735, Dec. 16, 1977, which is a continuation-in-part of Ser. No. 689,472, May 24, 1976, abandoned.

[51] Int. Cl.$^2$ ............................................. B60N 1/08
[52] U.S. Cl. ................................. 248/636; 248/429
[58] Field of Search ............... 248/424, 429, 430, 576, 248/611, 636, 638; 52/167

[56] References Cited

U.S. PATENT DOCUMENTS

| | | | |
|---|---|---|---|
| 1,215,736 | 2/1917 | Stafford et al. | 267/9 C |
| 1,979,860 | 11/1934 | Browne | 248/430 |
| 2,834,396 | 5/1958 | Herider et al. | 248/430 X |
| 2,932,342 | 4/1960 | Simons et al. | 248/429 X |
| 3,061,260 | 10/1962 | Simons et al. | 248/563 |
| 3,188,045 | 6/1965 | Fowler et al. | 248/429 |
| 3,190,592 | 6/1965 | Grizzle | 248/429 |
| 3,258,241 | 6/1966 | Oswald | 248/430 |
| 3,325,137 | 6/1967 | Knudsen | 248/424 |
| 3,335,996 | 8/1967 | Hall | 248/563 |
| 3,390,857 | 7/1968 | Nystrom | 248/575 |

FOREIGN PATENT DOCUMENTS

| | | |
|---|---|---|
| 871676 | 2/1953 | Fed. Rep. of Germany . |
| 1630556 | 6/1971 | Fed. Rep. of Germany . |
| 2304950 | 8/1973 | Fed. Rep. of Germany . |
| 2721926 | 12/1977 | Fed. Rep. of Germany . |
| 742189 | 3/1933 | France . |
| 42243 | 6/1933 | France . |
| 1524994 | 4/1968 | France . |
| 623871 | 5/1949 | United Kingdom . |
| 1081539 | 8/1967 | United Kingdom . |
| 1199577 | 7/1970 | United Kingdom . |
| 1303936 | 1/1973 | United Kingdom . |

Primary Examiner—William H. Schultz

[57] ABSTRACT

A vibration attenuator seat includes a seat assembly with a pair of paralleled shafts slidable in horizontally positioned, ultra low friction, linear bearings mounted in a base assembly. A seat adjustment assembly has a bottom part which is a part of the base assembly and a latch in its top part for engaging the bottom part to lock the top and bottom parts in a plurality of positions. A pin secured to the top part of the assembly centers the seat assembly relative to the top part by being connected by one preloaded, closed-coil spring to one end of the seat assembly and by a second preloaded, closed-coil spring to the other end. The body of a shock absorber positioned parallel to the shafts is secured to the pin and the rod is secured to the seat assembly. The latch allows positioning adjustment of the seat assembly relative to the base assembly and the shock absorber attenuates shocks and vibrations between the base and seat assemblies while the springs provide preloaded biasing towards the adjusted position.

19 Claims, 7 Drawing Figures

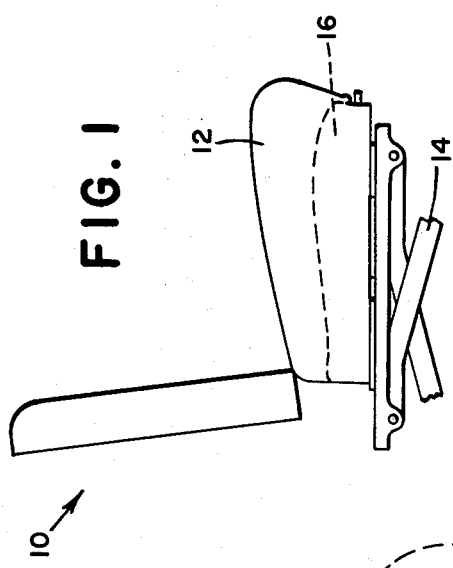
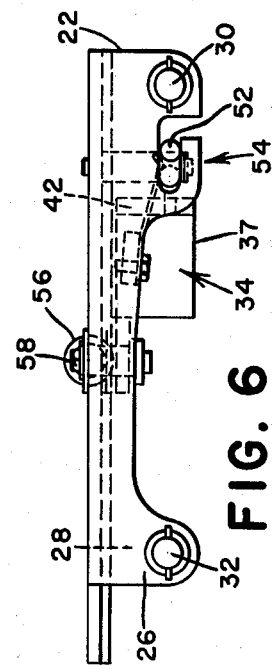
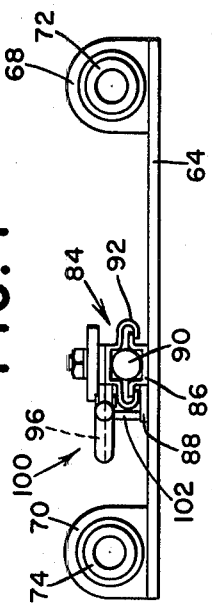
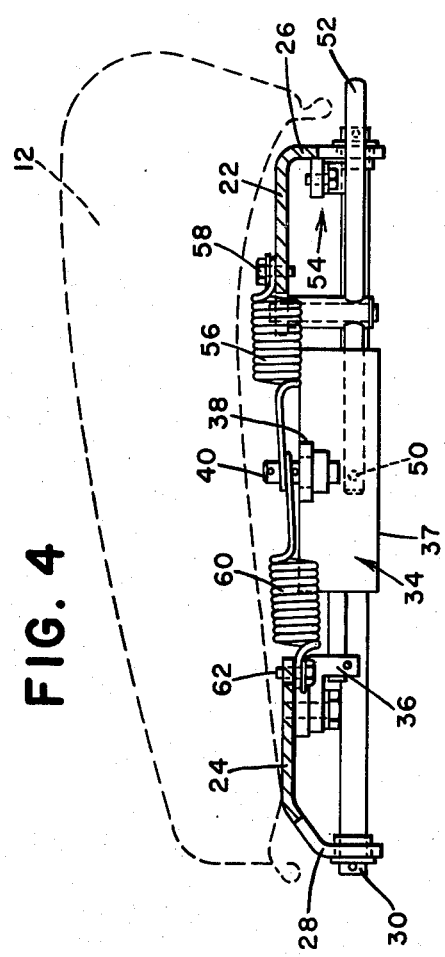
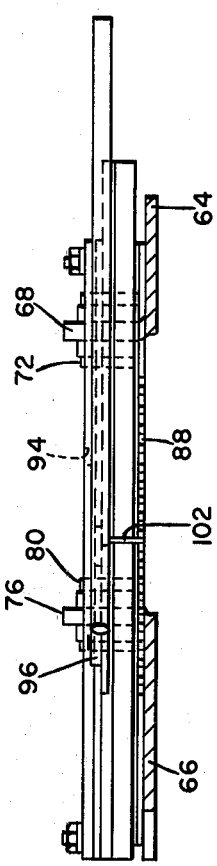

VIBRATION ATTENUATOR SEAT

CROSS REFERENCE TO RELATED APPLICATION

This application is a continuation of U.S. application Ser. No. 861,735 filed Dec. 16, 1977, which is a continuation-in-part of U.S. application Ser. No. 689,472, filed May 24, 1976 now abandoned.

BACKGROUND OF THE INVENTION

The present invention relates generally to horizontally acting seat suspensions for vehicles and more particularly to a shock absorbing horizontal seat suspension for off-road vehicles.

In the past, prior art horizontal seat suspensions such as those typified by the U.S. Pat. Nos. to Smith (2,850,073), Simmons et al (2,932,324), Radke et al (3,100,617), Grizzle, Jr. (3,190,592), and Oswald (3,258,241) were simple spring mass systems which were intended only for on-road vehicles and use where horizontal vibrations are invariably above the natural frequency of the seat suspensions.

When the vehicle is driven off-road where the vibrations and shocks are routinely below the natural frequency of the seat suspension, conventional practice dictates the use of a lockout device to deactivate the simple spring mass system and to rigidly secure the seat to the vehicle. Of course this means that no vibration or shock attenuation is provided for off-road driving.

Attenuation of off-road vibrations and shocks has been a long standing, industry-wide problem and the problem has been especially acute in the agricultural industry where the vehicles are tractors and combines which are intended primarily for offroad use.

Only after extensive experimentation and analyses has it been determined that the prior art suspensions are unsuited and unmodifiable for off-road vehicles. A significant number of interrelated acceptable seat suspensions could be evolved.

In order to obtain maximum attenuation of vibration imposed on the operator in a spring mass system, a low spring rate spring is essential. However, a low spring rate spring alone presents the problems that small static loads or imputs at or below the natural frequency generate large displacements of the seat relative to the vehicle. Further, shock loads cause the spring mass system to resonate due to the inherent low centering forces acting to return the seat to the ideal centered position. These problems are unacceptable when the seated operator to vehicle controls distance must be maintained within plus or minus one inch (25.4 mm) from the ideal centered position.

Further modification and testing of prior art suspensions revealed that low spring rates result in the suspension working to one end of the displacement or continuously hitting displacement stop devices as the vehicle was driven on slopes or over rough, off-road terrain. A thorough analysis indicated that the problems arose in part from static loads, system friction, and directionally random low frequency vibrations and shocks which are all related to the low spring force due to the low spring rate. Attempts to add a shock absorber to alleviate some of the problems were unsuccessful, again because the low spring force would not center the seat to provide adequate travel for proper operation of the shock absorber. Attempts to reduce system friction with low friction bearings resulted in the spring mass system being subject to unacceptable resonance under shock loads and greater problems with the small static loads.

Since the prior art suspensions could not be modified to produce an acceptable horizontal seat suspension, an entirely new approach was used. The result is a totally new, complex spring mass system utilizing a pair of opposed, unidirectionally acting, preloaded springs. The new system provides positive centering forces while allowing low spring rate springs and prevents system resonance after shock loads.

To insure that the positive centering forces would center the seat, it was discovered that ultra low friction bearings were required in the seat displacement support to prevent binding under small static loads, system friction, and directionally random low frequency inputs.

Only after combining the features of the new spring system and the ultra low friction bearings was it possible to add a shock absorber to obtain acceptable and highly satisfactory performance of the suspension above and below the natural frequency of the spring mass system.

SUMMARY OF THE INVENTION

The present invention provides a horizontally acting, vibration attenuation seat utilizing a pair of opposed, unidirectionally acting, preloaded springs to center a seat assembly which is movable with a predetermined ultra low coefficient of friction relative to a base assembly.

The present invention further provides a horizontally acting, shock attenuation seat utilizing a shock absorber in parallel with a pair of opposed, unidirectionally acting preloaded springs which center a seat assembly movable with a predetermined ultra low coefficient of friction relative to a base assembly.

The present invention further provides a horizontally acting, vibration and shock attenuation seat which functions even when vibrations and shocks are applied which are not in the direction of vibrations and shocks being attenuated.

The above and additional advantages of the present invention will become apparent to those skilled in the art from a consideration of the following detailed description of the preferred embodiment when taken in conjunction with the accompanying drawings.

BRIEF DESCRIPTION OF THE DRAWINGS

In the drawings:

FIG. 1 is a drawing of the seat incorporating the present invention;

FIG. 4 is a sectional view taken along line 4—4 of FIG. 2;

FIG. 5 is a sectional view taken along line 5—5 of FIG. 3;

FIG. 6 is a front view of FIG. 4; and

FIG. 7 is a front view of FIG. 5.

DESCRIPTION OF THE PREFERRED EMBODIMENT

Figures 2, 3:
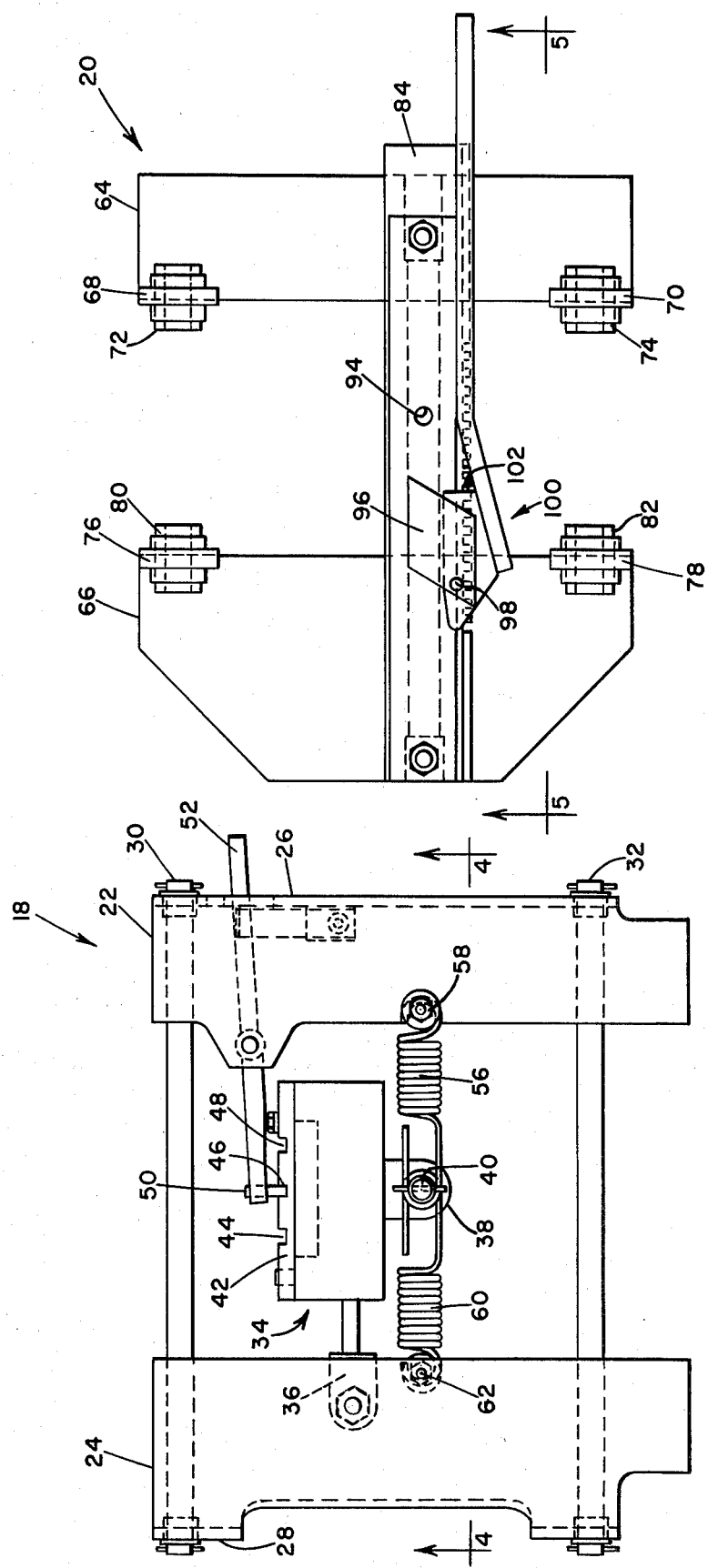
FIG. 2 is a plan view of the top portion of the present invention.
FIG. 3 is a plan view of the bottom portion of the present invention.

Referring now to FIG. 1, therein is shown a seat 10 having a cushioned seat portion 12, a vertical seat suspension 14, and a horizontal seat suspension 16 embodying the present invention. The horizontal seat suspension 16 consists of two basic assemblies.

Referring to FIG. 2, therein is shown a seat assembly 18 which is the upper assembly of the horizontal seat suspension 16 and, referring to FIG. 3, therein is shown a base assembly 20 which is the lower assembly of the horizontal seat suspension 16.

The seat assembly 18 includes a pair of seat support brackets 22 and 24 having downturned flanges 26 and 28, respectively, which may better be seen by reference to FIGS. 4 and 6. Inserted in the downturned flanges 26 and 28 are a pair of linear bearing shafts 30 and 32 which are spaced parallel to one another and parallel to the direction in which the vibration and shock is to be dampened.

The seat assembly further includes a conventional variable rate shock absorber 34. The rod of the shock absorber 34 is secured to the seat support bracket 24 by means of a bracket 36. The shock absorber 34 contains internal porting to make the dampening effect equal for both directions of travel. The porting further assures greater dampening at the ends of the stroke than at the middle and assures that the shock absorber 34 will not reach its maximum extended or retracted position. It may be noted that in some applications where unequal dampening effect in each direction is desired, the change can be accomplished by modification to the shock absorber 34 which would be evident to those skilled in the art. Integral with and medially positioned on the cylinder body 37 of the shock absorber 34 is an ear 38 for receiving a double-ended centering stud 40, the purpose of which will later be explained. Secured to the cylinder body 37 opposite the ear 38 is a notched plate 42 having therein first, second, and third notches 44, 46, and 48, respectively. Engageable with the notches is a lockout pin 50 which is inserted in a shock absorber lockout lever 52. The lever 52 is pivotally secured to the seat support bracket 22 and protrudes through a conventional leaf spring detent mechanism 54 in the turndowned flange 26.

The upper end of the centering stud 40 is connected by a first centering extension spring 56 to a bolt 58 in the seat support bracket 22 and is connected by a second centering extension spring 60 to a bolt 62 in the seat support bracket 24. Since the opposed centering springs 56 and 60 are generally selected to be of equal capacity, they act to keep the centering stud 40 substantially centered between the seat support brackets 22 and 24 and thus maintain the shock absorber 34 in a centered position also. The centering springs 56 and 60 are conventional springs which have an initial predetermined tension or preload wound into them which must be overcome before they will extend from their normally closed coiled positions. This provides a minimum positive centering force for the seat assembly 18 at all times with each of the springs operating in only one direction. This unidirectional operation is assured by the large looped ends of the springs which are best seen in FIG. 2. Since the centering springs 56 and 60 are used only for centering and not for supporting a suspended mass, they are predetermined low spring rate springs which are chosen so as to lower the natural frequency of the horizontal seat suspension 16 as much as possible as would be evident to those skilled in the art.

Referring now to FIG. 3, the base assembly 20 includes a pair of base brackets 64 and 66. The base bracket 64 has a pair of integral upright ears 68 and 70 into which a pair of parallel linear bearings 72 and 74, respectively, are inserted and secured. The base bracket 66 likewise has a pair of upright integral ears 76 and 78 holding parallel linear bearings 80 and 82, respectively. The bearings 72 and 80 are co-linear to encircle and allow reciprocating motion of the linear bearing shaft 30; and linear bearings 74 and 82 are co-linear to encircle and allow reciprocating motion of the linear bearing shaft 32.

In the preferred embodiment, it has been determined that precision, recirculating-ball, linear anti-friction bearings having ultra low coefficients of friction of approximately 0.006 to 0.010 are required for the seat 10 to operate satisfactorily. Theoretically, coefficients of static friction up to 0.050 will be marginally acceptable and, experimentally, it has been determined that a coefficient above 0.060 is unacceptable. For purposes of comparison, it should be noted that previous seat suspensions had coefficients of around 0.150.

The base brackets 64 and 66 are connected by a conventional low friction slider assembly generally designated by the number 84. The slider assembly 84 includes a lower portion 86, best seen by reference to FIGS. 5 and 7, which is secured by bolts (not shown) at one end to the base bracket 64 and at the other end to base bracket 66. The lower portion 86 further includes laterally extending teeth 88, the purpose of which will be later described. Antifriction means in the form of balls 90 minimize system friction and roll in the lower portion 86 and allow motion of the upper portion 92. The upper portion 92 contains a hole 94 into which the lower end of the centering stud 40 is inserted and fixed.

Attached to the upper portion 92 and extending to one side thereof is a plate 96 to which is secured a pivot pin 98. An adjustment latch 100 is secured to the pivot pin 98 for pivotation thereabout. The adjustment latch 100 contains a downturned finger 102 which engages the teeth 88 when the adjustment latch 100 is in the position shown in FIG. 3. When the finger 102 is in engagement with the teeth 88, relative movement between the lower portion 86 and the upper portion 92 is prevented. By moving the adjustable latch 100 to move the finger 102 out of engagement, the lower portion 86 and the upper portion 92 are free to move relative to one another.

In operation, the seat is first adjusted to suit an individual occupant by moving the adjustment latch 100 so as to disengage the finger 102 from the teeth 88. This allows relative movement between the lower portion 86 and the upper portion 92 of the slider assembly 84 and also the seat assembly 18 relative to the base assembly 20. When the seat reaches the desired position, the adjustment latch 100 is re-engaged to fix the slider assembly 84. Due to the centering forces imposed on the centering stud 40 by the centering springs 56 and 60, the seat assembly 18 will be positioned in a centered operating position.

For the majority of shock loads which impose high acceleration forces on operators in the fore-aft or pitch mode, under severe field conditions, the shock will be taken up by the shock absorber 34 which will dampen the energy normally imposed on the operator. In the preferred embodiment, the seated operator is seldom moved more than one inch (25.4 mm) fore or aft of the centered operating position under even the most severe shocks. The variable rate operation of the shock absorber will cause the dampening factor to increase as the seat assembly slides in the linear bearings 72, 74, 80, and 82 further and further away from the centered operating position, thus gently attenuating shocks.

In the event that it is desired to lock out the horizontal seat suspension for precision operator control, the shock absorber lockout lever 52 can be moved in the detent mechanism 54 so as to cause the lockout pin 50 to engage in a notch in the notch plate 42. The engagement of the lockout pin 50 in one of the notches 44, 46, or 48 operates to secure the seat assembly 18 to the base assembly 20 and prevent relative motion therebetween.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A vibration attenuator seat comprising: a base assembly; a seat assembly; antifriction means connecting the base assembly to the seat assembly and supporting the seat assembly relative to the base assembly for predetermined ultra low coefficient of friction horizontal movement of the seat assembly relative to the base assembly; first spring means having a predetermined low spring rate and a predetermined preload operatively connecting the seat assembly to the base assembly for urging the seat assembly in a first direction with a first predetermined spring force and holding the seat assembly in a predetermined operating position with a first predetermined preload force relative to the base assembly; and second spring means having a predetermined low spring rate and a predetermined preload operatively opposed to the first spring means and operatively connecting the seat assembly to the base assembly for urging the seat assembly in a second direction opposite the first direction with a second predetermined spring force and holding the seat assembly in the predetermined operating position with a second preload force relative to the base assembly whereby a positive centering force towards the predetermined operating position is always provided.

2. The vibration attenuator seat as claimed in claim 1 wherein the first spring means and the second spring means have equal predetermined low spring rates and equal predetermined preloads.

3. The vibration attenuator seat as claimed in claim 1 including a shock absorber operatively connecting the seat assembly and the base assembly for attenuating excursions of the seat assembly from the predetermined operating position while allowing the first and second spring means to urge the seat assembly to the predetermined operating position.

4. The vibration attenuator seat as claimed in claim 1 wherein the antifriction means has a predetermined coefficient of friction of not more than 0.050.

5. The vibration attenuator seat as claimed in claim 1 wherein the antifriction means has a predetermined coefficient of friction between 0.006 and 0.010.

6. The vibration attenuator seat as claimed in claim 5 wherein the antifriction means has said coefficient of friction for vibrations and shocks in all directions, perpendicular to the direction of horizontal movement of the seat assembly.

7. A vibration attenuator seat comprising: a seat assembly having first and second spaced apart ends; a base assembly having first and second spaced apart ends and a center portion disposed between the ends; antifriction means connecting the seat assembly to the base assembly and supporting the seat assembly above the base assembly for predetermined ultra low coefficient of friction horizontal linear movement of the seat assembly relative to the base assembly; first spring means connected at one end to the first end of the seat assembly and connected at the other end to the center portion of the base assembly disposed in a preloaded, closed-coil condition to prevent an increase in the distance of the first end of the seat assembly from the center portion of the base assembly until first predetermined load in a first direction is exceeded and to allow an increase in the distance of the first end of the seat assembly from the center portion of the base assembly in a second direction opposite the first direction; second spring means connected at one end to the second end of the seat assembly and connected at the other end to the center portion of the base assembly disposed in a preloaded, closed-coil condition to prevent an increase in the distance of the second end of the seat assembly from the center portion of the base assembly until a second predetermined load in the second direction is exceeded and to allow an increase in the distance of the second end of the seat assembly from the center portion of the base assembly in the first direction.

8. The vibration attenuator seat as claimed in claim 7 wherein the first and second spring means respectively have first and second predetermined low spring rates, to respectively urge the first and second ends of the seat assembly respectively in the second and first directions towards the center portion of the base assembly respectively with first and second low spring forces.

9. The vibration attenuator seat as claimed in claim 7 including a shock absorber having a body portion connected to the center portion of the base assembly and a rod portion connected to the first end of the seat assembly for attenuating excursions of the seat assembly from a centered operating position in which the first and second spring means are disposed in preloaded, closed-coil conditions while allowing the first and second spring means to respectively urge the seat assembly towards the centered operating position.

10. The vibration attenuator seat as claimed in claim 7 wherein the base assembly includes means for moving the center portion of the base assembly relative to the first and second ends thereof.

11. The vibration attenuator seat as claimed in claim 7 wherein the antifriction means has a predetermined coefficient of friction of not more than 0.050.

12. The vibration attenuator seat as claimed in claim 7 wherein the antifriction means has a predetermined coefficient of friction between 0.006 and 0.010.

13. The vibration attenuator seat as claimed in claim 12 wherein the seat assembly includes a shaft portion extending parallel to the direction of horizontal linear movement, the antifriction means includes means encircling the shaft portion of the seat assembly, and the base assembly includes means encircling the antifriction means whereby the predetermined coefficient of friction is applied to all loads perpendicular to the shaft portion of the seat assembly.

14. A vibration attenuator seat comprising: a seat assembly having first and second spaced apart ends and a shaft portion connecting the ends; a base assembly having first and second spaced apart ends and a center portion disposed therebetween; antifriction means disposed in and encircled by the base assembly, said antifriction means encircling the shaft portion of the seat assembly and providing a predetermined ultra low coefficient of friction between the shaft portion and the base assembly for horizontal linear movement of the seat assembly relative to the base assembly; first spring means connected at one end to the first end of the seat assembly and connected at the other end to the center portion of the base assembly disposed in a preloaded, closed-coil condition to prevent an increase in the distance of the first end of the seat assembly from the center portion of the base assembly until a first predetermined load in a first direction is exceeded and to urge the first end of the seat assembly toward the center portion of the base assembly with a first predetermined low spring force until the closed-coil condition is regained, said first spring means including means for allowing an unrestricted increase in the distance of the first end of the seat assembly from the center portion of the base assembly in a second direction opposite the first direction; second spring means connected at one end to the second end of the seat assembly and connected at the other end to the center portion of the base assembly, disposed in a preloaded, closed-coil condition to prevent an increase in the distance of the first end of the seat assembly from the center portion of the base assembly until a second predetermined load in a second direction is exceeded and to urge the second end of the seat assembly toward the center portion of the base assembly with a second predetermined low spring force until the closed-coil condition is regained, said first spring means including means allowing an unrestricted increase in the distance of the second end of the seat assembly from the center portion of the base assembly in the second direction.

15. The vibration attenuator seat as claimed in claim 14 wherein the first and second spring means respectively have first and second predetermined preloads and first and second predetermined low spring rates, and the first and second predetermined preloads are equal and the first and second predetermined low spring rates are equal.

16. The vibration attenuator seat as claimed in claim 14 including a shock absorber having a body portion connected to the center portion of the base assembly and a rod portion connected to the first end of the seat assembly for attenuating excursions of the seat assembly from a centered operating position in which the first and second spring means are disposed in preloaded, closed-coil conditions while allowing the first and second spring means to respectively urge the seat assembly towards the centered operating position.

17. The vibration attenuator seat as claimed in claim 14 wherein the base assembly includes means for moving the center portion of the base assembly relative to the first and second ends thereof and the base assembly includes means for locking the center portion of the base assembly in a plurality of positions relative to the first and second ends thereof.

18. The vibration attenuator seat as claimed in claim 14 wherein the antifriction means has a predetermined coefficient of friction of not more than 0.050.

19. The vibration attenuator seat as claimed in claim 14 wherein the antifriction means has a predetermined coefficient of friction between 0.006 and 0.010.

* * * * *

UNITED STATES PATENT OFFICE
CERTIFICATE OF CORRECTION

Patent No. 4,228,984  Dated  21 October 1980

Inventor(s)  James E. Thompson and Robert L. Mayfield

It is certified that error appears in the above-identified patent and that said Letters Patent are hereby corrected as shown below:

Column 6, line 12, after "until" insert -- a --.

Signed and Sealed this

Twenty-sixth Day of May 1981

[SEAL]

Attest:

RENE D. TEGTMEYER

Attesting Officer  Acting Commissioner of Patents and Trademarks